Patented Nov. 24, 1925.

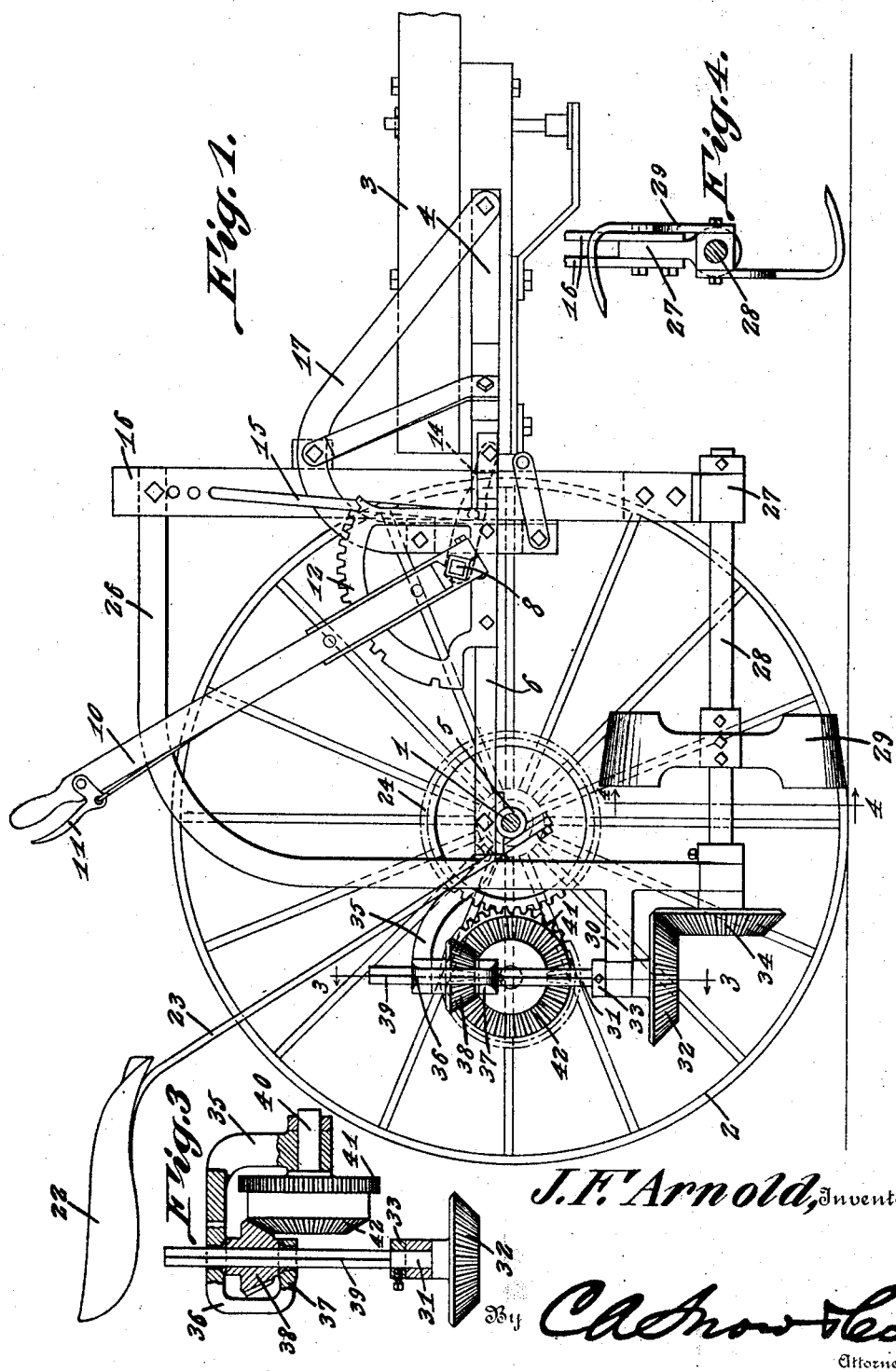

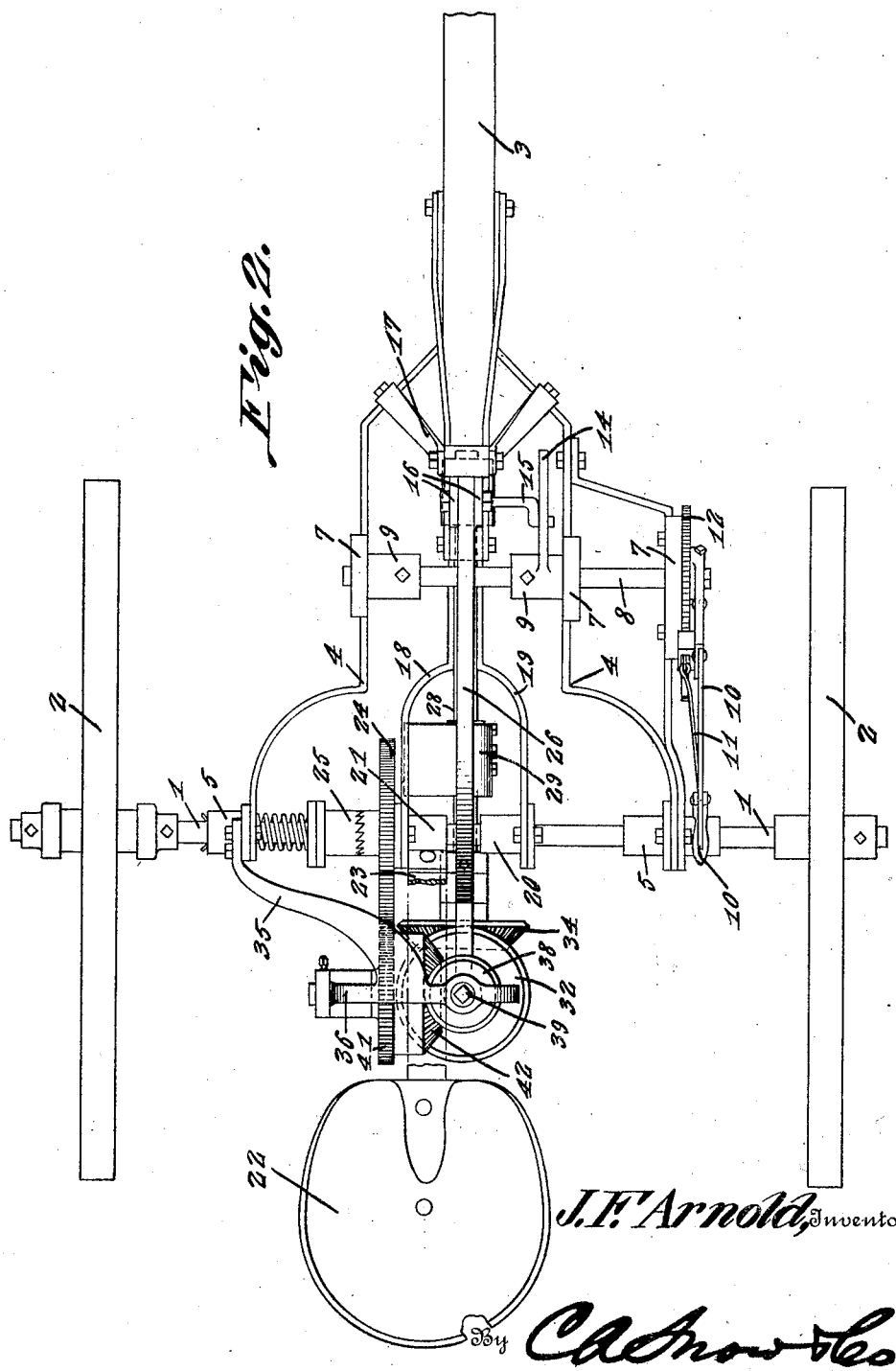

1,562,731

UNITED STATES PATENT OFFICE.

JAMES FINIS ARNOLD, OF KAUFMAN, TEXAS, ASSIGNOR TO C. A. NORWOOD, OF KAUFMAN, TEXAS.

COTTON CHOPPER.

Application filed October 5, 1923. Serial No. 666,795.

*To all whom it may concern:*

Be it known that I, JAMES FINIS ARNOLD, a citizen of the United States, residing at Kaufman, in the county of Kaufman and State of Texas, have invented a new and useful Cotton Chopper, of which the following is a specification.

This invention aims to provide a cotton chopper comprising few parts, and simple in operation, the device being so constructed that it may be assembled readily with a standard form of cotton planter without working extensive changes in the planter.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in vertical longitudinal section, a device constructed in accordance with the invention, most parts appearing in elevation; Figure 2 is a top plan; Figure 3 is a section on the line 3—3 of Figure 1; Figure 4 is a section on the line 4—4 of Figure 1.

Although the device forming the subject matter of this application may be assembled with cotton planters of widely different forms, it has been shown as mounted on a standard and well known planter, and disclosed in Patent No. 1,115,813, granted on November 10, 1914 to C. P. A. Friberg. The planter above alluded to will be described, so far is its constituent parts are material to the present invention, and notice will be given at the proper place in the description, when a distinction is made between what is old and what is new.

In the drawings, there is shown a planter, comprising an axle 1, whereunto ground wheels 2 are connected. The tongue is shown at 3 and is connected by main frame bars 4 and bearing brackets 5 with the axle 1. A supplemental bar 6 is located at one side of the machine and is connected at its forward end to one of the main frame bars 4, the rear end of the bar 6 being joined to the corresponding bearing bracket 5. Bearings 7 are mounted on the bars 4 and 6, and in the bearings, a transverse rock shaft 8 is journaled. Collars 9 on the shaft 8, coacting with certain of the bearings 7, hold the shaft 8 against endwise movement. A hand lever 10 is secured to one end of the shaft 8 and has a latch mechanism 11 coacting with a segment 12 carried by one of the bearings 7. One of the collars 9 has a forwardly extended crank arm 14 whereunto an upwardly extended link 15 is pivoted, the upper end of the link 15 being pivoted to a standard 16 guided for vertical reciprocation in a frame 17 connected to the main frame bars 4 and to the tongue 3. The frame work of the machine embodies rearwardly extended members 18 and 19, the member 19 being connected to a bearing collar 20 receiving the axle 1, and the member 18 being connected to a bearing collar 21 receiving the axle, a post 23 being connected to the collar 21, the post carrying a seat 22. A gear wheel 24 is journaled on the axle 1 and is located adjacent to the frame member 18, a clutch 25 serving to connect the gear wheel 24 with the axle 1, at the will of an operator. The clutch 25 may be opened by any suitable means, not shown and forming no part of the present invention.

The structure above described is shown in the patent above mentioned, and no claim is made to mechanism above alluded to saving in so far as the parts thereof may coact with parts hereinafter described.

In carrying out the invention, there is provided an inverted L-shaped bracket 26, the upper forward end of which is detachably secured to the upper end of the standard 16. In the lower end of the standard 16, a bearing 27 is detachably mounted. A shaft 28 is journaled in the bearing 27 and in the lower end of the bracket 26 and extends parallel to the draft line. The shaft 28 carries a rotary chopper 29, operating transversely of the draft line, in a well known way. Adjacent to its lower end, the bracket 26 is supplied with a rearwardly extended arm 30 wherein is journaled a vertical shaft 31. A beveled pinion 32 is secured to the lower end of the shaft 31. A set collar 33 is mounted on the shaft 31. The arm 30 is located between the set collar 33 and the beveled pinion 32 and, thus, the shaft 28 is connected to the lower portion of the bracket 26, for rotation thereon, and for vertical movement along with the bracket 26. The beveled pinion 32 on the shaft 31 meshes with a beveled pinion 34 secured to the rear end of the shaft 28. The numeral 35 denotes a hanger which may be mounted on any accessible part of the frame work of the machine. In the present embodiment of the invention, but not necessarily, the hanger 35 is mounted on one of the bearing brackets 5. At its upper end, the hanger 35 is provided with an inverted U-shaped head 36 disposed transversely of the machine and having an underlying arm 37. A beveled pinion 38 is located between the arm 37 and the upper portion of the head 36, the hub of the beveled pinion being journaled in the parts 37 and 36 as shown clearly in Figure 3. The shaft 31 has a squared part 39, slidable in the beveled pinion 38. A stub shaft 40 is mounted in one end portion of the head 36 and carries a pinion 41, meshing with the gear wheel 24. A beveled gear 42 is connected to the pinion 41, to rotate therewith, and meshes with the beveled pinion 38 through which the squared part 39 of the shaft 31 slides vertically.

In practical operation, when the gear wheel 24 is connected with the axle 1 by the clutch 25, rotation will be imparted by the ground wheel 2 and the axle 1 to the gear wheel 24, the wheel 24 rotating the pinion 41, the beveled gear 42 rotating the beveled pinion 38 and rotation being imparted to the shaft 31. From the shaft 31, the beveled pinions 32 and 34 rotate the shaft 28, the chopper 29 operating in a way which is understood well by those skilled in the art.

Rocking movement may be imparted to the shaft 8 by way of the hand lever 10, the crank arm 14 and the link 15 imparting vertical movement to the standard 14, the bracket 26, the shaft 28 and the chopper 29 being moved vertically. In this way, the chopper 29 may be raised and lowered with respect to the surface of the soil, at the will of an operator. When the bracket 26 is raised and lowered, the squared part 39 of the shaft 31 slides through the beveled pinion 38, it being possible thus, to raise and lower the chopper 29 without breaking the driving engagement between the beveled elements 38 and 42 of Figure 3.

What is claimed is:—

In a device of the class described, a frame; an axle journaled thereon; a ground wheel carried by the axle; a standard vertically adjustable on the frame; a rearwardly extended bracket connected to the upper end of the standard and prolonged downwardly behind the axle; a shaft extended beneath the axle and journaled in the lower end of the bracket and in the lower end of the standard; a chopper carried by the shaft; means on the frame and connected to the standard for raising and lowering the standard and the bracket; and an operative connection between the shaft and the axle, and located behind the axle the connection comprising relatively movable parts permitting a raising and lowering of the standard and the bracket.

In testimony that I claim the foregoing as my own, I have hereto affixed my signature.

JAMES FINIS ARNOLD.